United States Patent [19]

Okamoto et al.

[11] Patent Number: 4,663,500
[45] Date of Patent: May 5, 1987

[54] CRYPTOGRAPHIC SYSTEM

[75] Inventors: Eiji Okamoto; Katsuhiro Nakamura, both of Tokyo, Japan

[73] Assignee: NEC Corporation, Japan

[21] Appl. No.: 878,518

[22] Filed: Jun. 23, 1986

Related U.S. Application Data

[63] Continuation of Ser. No. 514,159, Jul. 15, 1983, abandoned.

[30] Foreign Application Priority Data

Jul. 20, 1982 [JP] Japan .............................. 57-126183
Jul. 20, 1982 [JP] Japan .............................. 57-026184

[51] Int. Cl.$^4$ ............................................. H04L 9/00
[52] U.S. Cl. .................................... 380/47; 380/48; 380/50
[58] Field of Search ............... 178/22.14, 22.19, 22.10, 178/22.05, 22.17, 22.15, 22.16

[56] References Cited

U.S. PATENT DOCUMENTS 4,434,322  2/1984  Ferrell .............................. 178/22.14
4,447,672  5/1984  Nakamura ...................... 178/22.19

OTHER PUBLICATIONS

IBM Technical Disclosure Bulletin, "Block Chaining Using Plaintext-Ciphertext Feedback" by Ehrsam et al., vol. 22, #2 7/79.

Primary Examiner—Salvatore Cangialosi
Assistant Examiner—Aaron J. Lewis
Attorney, Agent, or Firm—Laff, Whitesel, Conte & Saret

[57] ABSTRACT

A cryptographic system comprises a modulo-2 adder having a first input receptive of a sequence of binary digits to be scrambled and a second input receptive of a sequence of scrambling binary digits for generating a sequence of scrambled binary digits. A function generator having a memory is provided for storing a predeterminable sequence of binary digits in addressible storage locations and reading the stored binary digits in response to an address code represented by combined first and second patterns of binary digits which are generated respectively by a random pattern generator and a shift register which is connected to the output of the modulo-2 adder. The output of the function generator is the scrambling binary digits applied to the modulo-2 adder.

9 Claims, 2 Drawing Figures

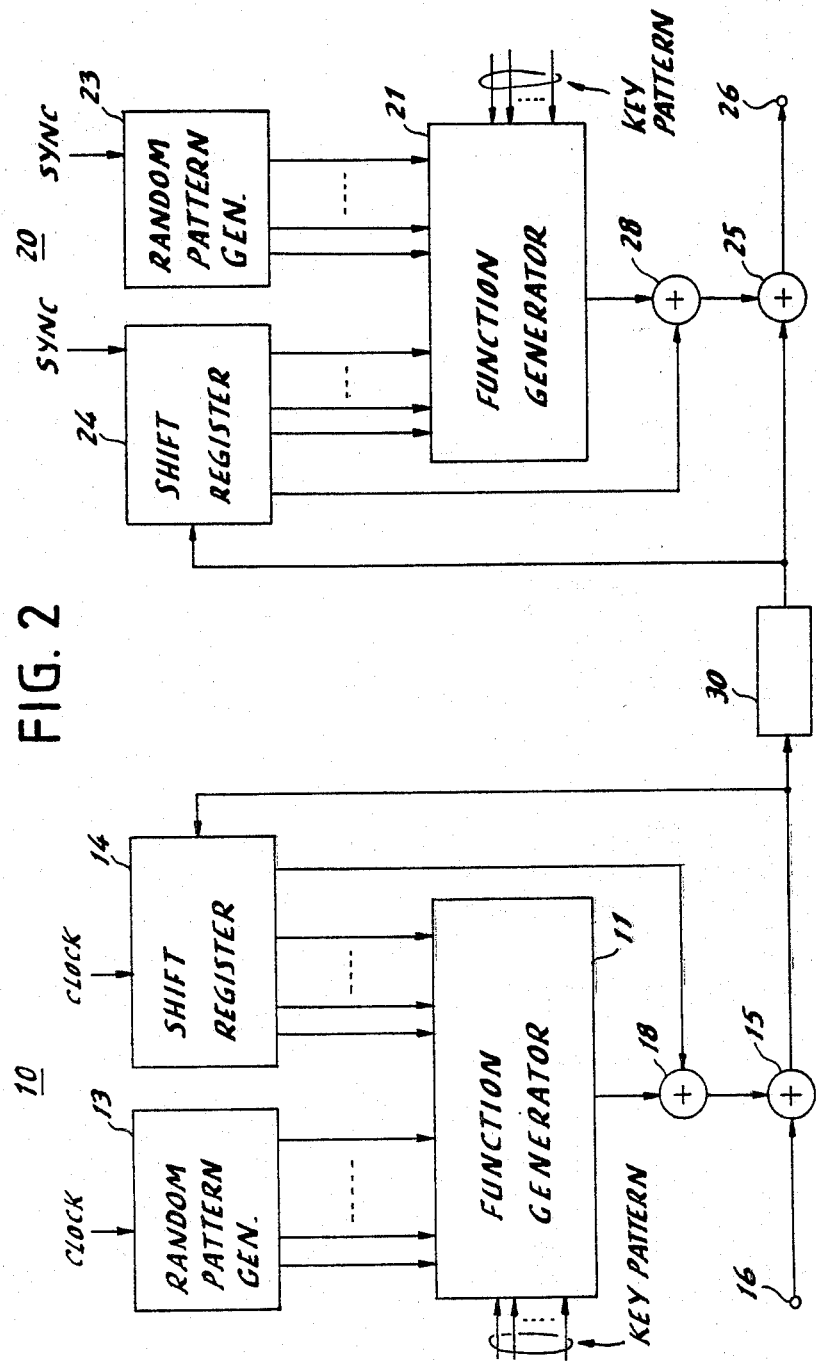

CRYPTOGRAPHIC SYSTEM

This is a continuation of U.S. patent application Ser. No. 06/514,159, filed July 15, 1983, now abandoned.

BACKGROUND OF THE INVENTION

The present invention relates to a cryptrographic system.

When scrambling digital information data, it is the current practice to employ a random number generator which generates a random pattern of binary 1's and 0's with which the data are modulo-2 summed. Current random number generators are broadly classified into a first type in which the random number is dependent exclusively on the initial value and a second type in which the random number is dependent on the scrambled data. The first type of random number generators is susceptible to wire tapping because the repetitive sequence of bit pattern is easily discernible by eavesdroppers. The second type of prior art scramblers comprises a shift register coupled to the output of a modulo-2 adder which combines input data with the output of a cypher memory which stores a sequence of binary digits as a key code and reads the stored bits in response to an address code supplied from the shift register. The descrambler used in conjunction with such scramblers also comprises a shift register that supplies an address code for addressing the same key pattern as in the scrambler stored in a decipher memory the output of which is coupled to a modulo-2 adder to be combined with the scrambled input data. Should a bit error occur in the transmitted sequence, decoded data will be disrupted and such disruption will continue as long as the error bit is shifted in the shift register. If the number of the shift register stages is substantial, the disruption will continue for a long period of time even if the disruption is caused by a single bit error.

SUMMARY OF THE INVENTION

It is therefore an object of the invention to provide a cryptographic system which prevents long-period data disruptions while ensuring security against eavesdroppers.

This object is obtained by combining the nonrepetitive characteristic of feedback random number generation and the repetitive characteristic of initial key pattern generation to form a combined address code with which stored bits of the key pattern are addressed for modulo-2 summation with information data bits.

A cryptographic system of the present invention comprises a data scrambler connected to one end of a medium for transmission of scrambled binary digits through said medium and a data descrambler connected to the other end of the medium to receive the transmitted binary digits. The data scrambler comprises a first modulo-2 adder having a first input connected to be responsive to a sequence of binary digits to be scrambled and a second input connected to be responsive to a sequence of scrambling binary digits for generating a sequence of scrambled binary digits for application to the medium. A first function generator having a memory is provided for storing a predeterminable sequence of binary digits in addressable storage locations and reading the stored binary digits in response to an address code represented by combined first and second patterns of binary digits which are generated respectively by a first pattern generator and a first shift register which is connected to the output of the first modulo-2 adder. The output of the first function generator is the scrambling binary digits applied to the first modulo-2 adder.

The data descrambler comprises a second modulo-2 adder having a first input connected to be responsive to the received binary digits and a second input connected to be responsive to a sequence of descrambling binary digits for generating a sequence of descrambled binary digits. A second function generator having a memory is included for storing a predeterminable sequence of binary digits in addressable storage locations and reading the stored binary digits in response to an address code represented by combined random patterns of binary digits which are generated respectively a second random pattern generator and a second shift register which is connected to be responsive to the received binary digits. The output of the second function generator is the descrambling binary digits applied to the second modulo-2 adder.

In the event of a transmission error, a disruption will occur in the bit stream in the second shift register. However, the disruption persists as long as the error bit exists in the second shift register which accounts for only a portion of the full address code of the second function generator. Therefore, the cryptographic system of the invention has a smaller disruption time than that of the second type of prior art while eliminating the disadvantage of the first type of prior art.

BRIEF DESCRIPTION OF THE DRAWINGS

The present invention will be described in further detail with reference to the accompanying drawings, in which:

FIG. 2 is an illustration of an alternative embodiment of the invention.

DETAILED DESCRIPTION

Figure 1:
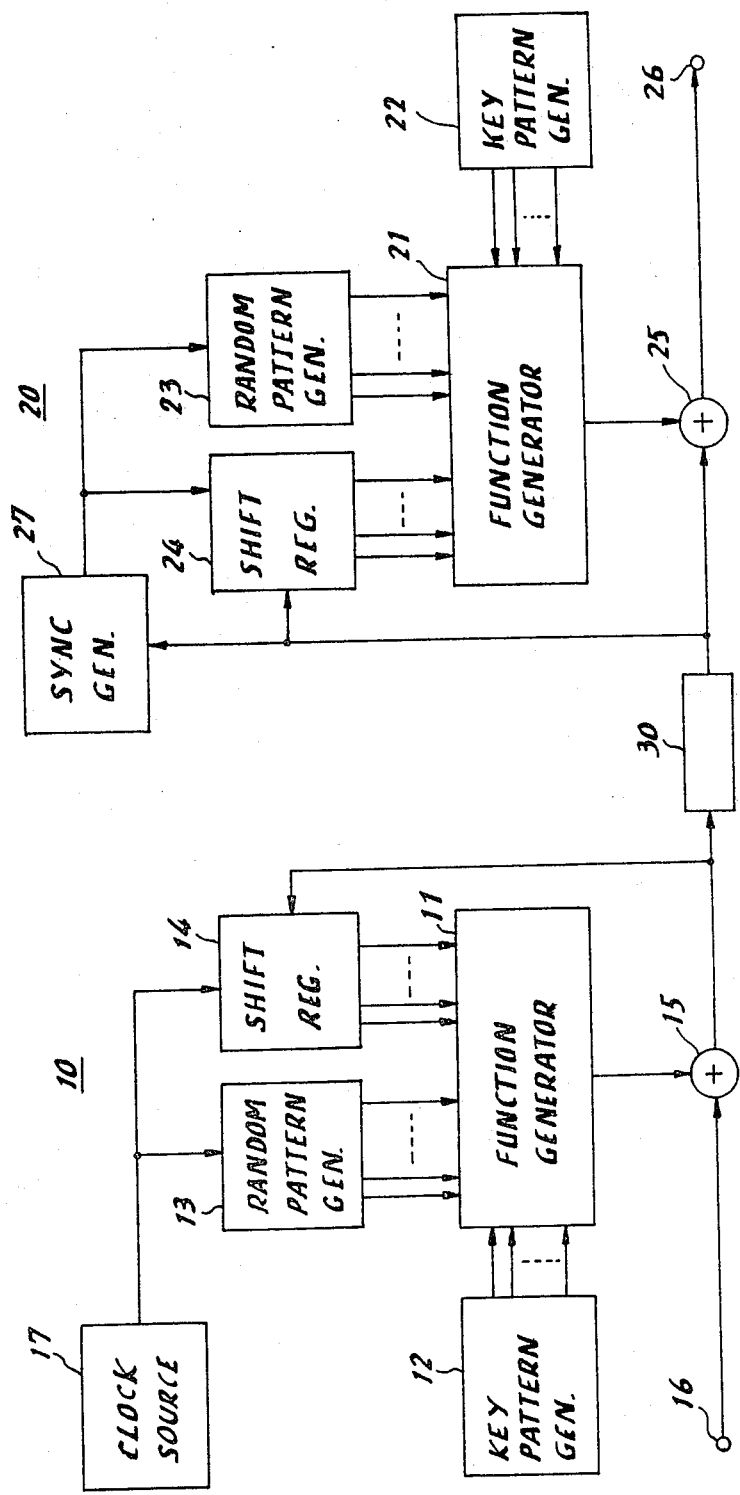
FIG. 1 is a schematic illustration of a preferred embodiment of the invention.

Referring now to FIG. 1, there is shown a cryptographic system of the present invention. The system generally comprises a data scrambler 10 and a data descrambler 20 connected over a transmission medium 30. The data scrambler 10 comprises a function generator 11, a key pattern generator 12, a random pattern generator 13, a shift register 14 and a modulo-2 adder or Exclusive-OR gate 15. The function generator 11 may comprise a read-only memory or random access memory for storing a random sequence of binary 1's and 0's supplied from the key pattern generator 12 in addressible locations. The random pattern generator 13 may comprise a linear feedback shift register which generates a sequence of random patterns of parallel binary 1's and 0's in response to a clock pulse supplied from a clock source 17. The function generator 11 reads the stored binary 1's and 0's as a function of an address code which combines the outputs of the random pattern generator 13 and shift register 14. The output of the function generator 11 is therefore a random sequence of scrambling binary 1's and 0's which are fed to the modulo-2 adder 15. A sequence of input digital data at input terminal 16 is modulo-2 summed in the adder 15 with the scrambling bits on a per bit basis. The scrambled data bits are sequentially applied on the one hand to the shift register 14 and on the other hand to the transmission medium 30. The shift register 14 supplies the stored bits to the function generator 11 in parallel form in response to the clock pulse supplied from the clock source 17 which is synchronized with the input digital data. The function generator 11 is also synchronized with the clock source 17 so that the scrambling data bits are time coincident with the input data bits at terminal 16.

The transmitted scrambled data bits are received by the data descrambler 20. The descrambler 20 operates on the received data bits in a process inverse to that of the scrambler 10. The scrambled data bits are applied to a shift register 24 having the same number of bit positions as the shift register 14. A function generator 21 identical to the function generator 11 stores a key pattern supplied from a key pattern generator 22 and reads the stored bits as a function of a combined set of address bits supplied from the shift register 24 and a random pattern generator 23 which is also identical to the random pattern generator 13. A bit synchronization pulse is obtained from a sync generator 27 coupled to the input terminal of the descrambler. The input bit stream is modulo-2 summed in an Exclusive-OR gate 25 with a sequence of descrambling bits from the function generator 21. The original bit stream is delivered from the modulo-2 adder 25 to an output terminal 26.

Since the number of bits stored in the shift register 24 accounts for a fraction of the number of address bits and is much smaller than the corresponding number of bits of the feedback type of prior art cryptographic system, a bit error in the received sequence will exist in the shift register 24 for a small interval time as compared with the prior art system, and the resultant disruption does not persist for a long period of time. Since the scrambled data sequence contains no repetitive patterns, the system ensures security against wire tapping.

FIG. 2 is an illustration of an alternative embodiment of the invention which is similar to the previous embodiment with the exception that in the scrambler 10 one of the output leads of the shift register 14 is disconnected from the function generator 11 and coupled instead to an input of a modulo-2 adder 18. The modulo-2 adder 18 takes its another input from the function generator 11 to provide a sequence of scrambling bits for coupling to the modulo-2 adder 15. Alternatively, one of the output leads of the random pattern generator 13 may be disconnected from the function generator 11 and coupled to the modulo-2 adder 18, instead of applying the one-bit output from the shift register 14. In like manner, the descrambler 20 includes a modulo-2 adder 28 which receives one of the output leads of the shift register 24 to proive modulo-2 summation with the output of the function generator 21 for generating a descrambling bit sequence for application to the modulo-2 adder 25.

What is claimed is:
1. A cryptographic system comprising:
a data scrambler connected to one end of a medium, said scrambler comprising:
a first modulo-2 adder means having a first input responsive to a sequence of binary digits to be scrambled and a second input responsive to a sequence of scrambling binary digits for generating a sequence of scrambled binary digits for application to said medium;
a first time base means for generating clock pulses;
a first pattern generator means for generating an first random pattern of binary digits in response to each of said clock pulses from said first time base means;
a first shift register means responsive to said scrambled binary digits for generating a second random pattern of binary digits; and
a first function generator means having a memory for storing a predeterminable sequence of binary digits in addressable storage locations and for reading the stored binary digits in response to an address code represented by combined first and second random patterns of binary digits supplied from said first pattern generator means and said first shift register means for generating a sequence of binary digits for application to the second input of said first modulo-2 adder means as said scrambling binary digits, and
a data descrambler means connected to the other end of said medium to receive said sequence of scrambled binary digits, said descrambler comprising:
a second time base means for generating clock pulses in response to binary digits of the received sequence;
a second modulo-2 adder means having a first input responsive to the received sequence of scrambled binary digits and a second input responsive to a sequence of descrambling binary digits for generating a sequence of descrambled binary digits;
a second pattern generator means for generating an third random pattern of binary digits identical to the first random pattern generated by said first pattern generator means in response to each of the clock pulses from said second time base means;
a second shift register means responsive to the received sequence of scrambled binary digits for generating a fourth random pattern of binary digits; and
a second function generator means having a memory for storing a predeterminable sequence of binary digits in addressable storage locations and for reading the stored binary digits in response to an address code represented by combined third and fourth random patterns of binary digits supplied from said second pattern generator means and said second shift register means for generating a sequence of said binary digits for application to the second input of said second modulo-2 adder means as said descrambling binary digits.

2. A cryptographic system as claimed in claim 1, wherein the number of binary digits in each of said first and third random patterns means is smaller than the number of binary digits in each of said second and fourth random patterns.

3. A cryptographic system as claimed in claim 1, wherein said first shift register means includes a first bit position and a plurality of second bit positions coupled to said first function generator means, and wherein said scrambler further comprises a third modulo-2 adder means having a first input connected to be responsive to said first bit position and a second input connected to be responsive to a sequence of binary digits supplied from said first function generator means and providing a sequence of binary digits for application to said first modulo-2 adder means as said scrambling binary digits, and wherein said second shift register means includes a first bit position and a plurality of second bit positions coupled to said second function generator means, said descrambler further comprising a fourth modulo-2 adder means having a first input connected to be responsive to said first bit position of said second shift register means and a second input connected to be responsive to a sequence of binary digits supplied from said second function generator means for application to said second modulo-2 adder means as said descrambling binary digits.

4. A data scrambler for cryptographic systems comprising:
- a modulo-2 adder means having a first input responsive to a sequence of binary digits to be scrambled and a second input responsive to a sequence of scrambling binary digits for generating a sequence of scrambled binary digits to be transmitted;
- a time base means for generating clock pulses;
- a pattern generator means for generating an first random pattern of binary digits in response to each of the clock pulses supplied from said time base;
- a shift register means responsive to said scrambled binary digits for generating a second random pattern of binary digits; and
- a function generator means having a memory for storing a predeterminable sequence of binary digits in addressible storage locations and for reading the stored binary digits in response to an address code represented by combined first and second random patterns of binary digits supplied from said pattern generator means and said shift register means for generating a sequence of binary digits for application to the second input of said modulo-2 adder means as said scrambling binary digits.

5. A data scrambler as claimed in claim 4, wherein the number of binary digits in said first random pattern is smaller than the number of binary digits in said second random pattern.

6. A data scrambler as claimed in claim 4, wherein said shift register means includes a first bit position and a plurality of second bit positions coupled to said function generator means, further comprising a second modulo-2 adder means having a first input connected to be responsive to said first bit position and a second input connected to be responsive to a sequence of binary digits supplied from said function generator means and providing a sequence of binary digits for application to the first-mentioned modulo-2 adder means as said scrambling binary digits.

7. A data descrambler for cryptographic systems comprising:
- a modulo-2 adder means having a first input respInsive to a received sequence of scrambled binary digits and a second input responsive to a sequence of descrambling binary digits for generating a sequence of descrambled binary digits;
- a time base means for generating clock pulses in response to the binary digits of the received sequence;
- a pattern generator means for generating an third random pattern of binary digits in response to each of the clock pulses supplied from said time base means;
- a shift register means responsive to the received sequence of scrambled binary digits for generating a fourth random pattern of binary digits; and
- a function generator means having a memory for storing a predeterminable sequence of binary digits in addressible storage locations and for reading the stored binary digits in response to an address code represented by combined third and fourth random patterns of binary digits supplied from said pattern generator means and said shift register means for generating a sequence of said binary digits for application to the second input of said modulo-2 adder means as said descrambling binary digits.

8. A data descrambler as claimed in claim 7, wherein the number of binary digits in said third random pattern is smaller than the number of binary digits in said fourth random pattern.

9. A data descrambler as claimed in claim 7, wherein said shift register means includes a first bit position and a plurality of second bit positions coupled to said function generator means, further comprising a second modulo-2 adder means having a first input connected to be responsive to said first bit position and a second input connected to be responsive to a sequence of binary digits supplied from said function generator means for application to beh first-mentioned modulo-2 adder means as said descrambling binary digits.

* * * * *